G. E. FLOWERS.
GREASE RETAINER FOR AUTOMOBILES.
APPLICATION FILED FEB. 26, 1914.
1,120,300.
Patented Dec. 8, 1914.
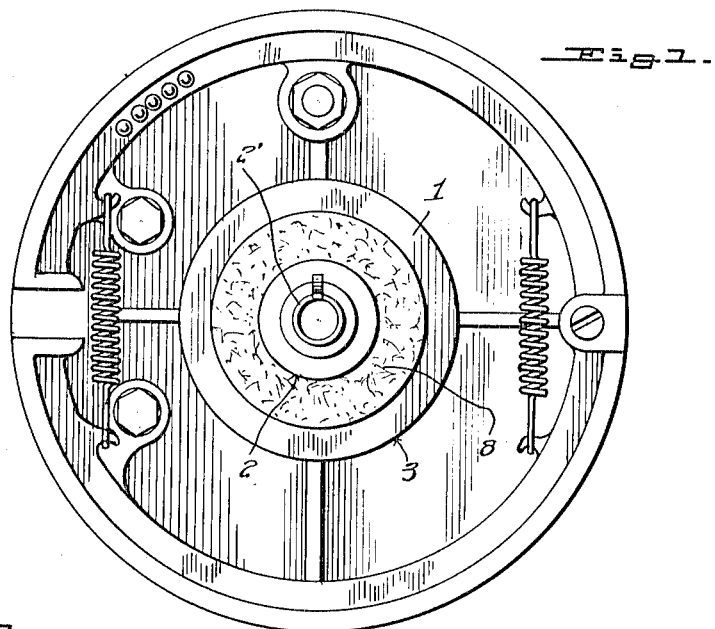
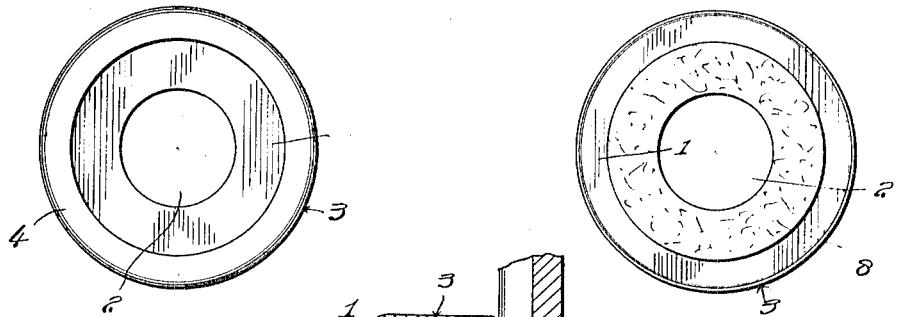
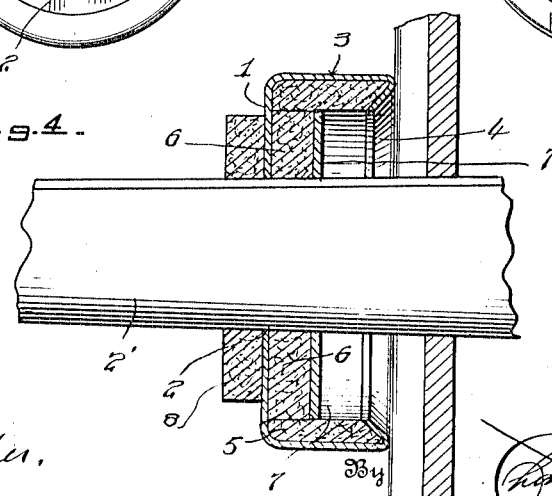
Inventor
G. E. Flowers.

UNITED STATES PATENT OFFICE.

GEORGE E. FLOWERS, OF DELHI, NEW YORK, ASSIGNOR OF ONE-HALF TO JAMES H. GRAY, OF DELHI, NEW YORK.

GREASE-RETAINER FOR AUTOMOBILES.

1,120,300. Specification of Letters Patent. Patented Dec. 8, 1914.

Application filed February 26, 1914. Serial No. 821,221.

*To all whom it may concern:*

Be it known that I, GEORGE E. FLOWERS, a citizen of the United States, residing at Delhi, in the county of Delaware, State of New York, have invented certain new and useful Improvements in Grease-Retainers for Automobiles; and I do hereby declare the following to be a full, clear, and exact description of the invention, such as will enable others skilled in the art to which it appertains to make and use the same.

The present invention is directed to improvements in devices for absorbing grease which may leak from the rear axle spindle of an automobile wheel.

The invention has for its object to so construct a device of this character that the same can be easily and quickly applied to the axle spindle of the rear wheel of an automobile, and when in place thereon will tend to prevent the grease from leaking from the axle, and should the grease leak it will be absorbed by the device.

With this and other objects in view, this invention resides in the novel features of construction, formation, combination and arrangement of parts to be hereinafter more fully described, claimed and illustrated in the accompanying drawing, in which:—

Figure 1 is a side elevation of the device, showing it in place upon the axle. Fig. 2 is a front view of the device removed. Fig. 3 is a rear view of the device removed. Fig. 4 is a longitudinal section of the device taken on a vertical plane.

Referring to the drawing, the numeral 1 designates a sheet metal washer provided with an opening 2 which will permit the same to be passed over the rear axle 2', said washer having its periphery terminating in an annular flange 3. The flange 3 terminates in an annular inclined flange 4, which is produced by bending the material before or after the felt ring 5 has been placed.

The felt washer 6 is placed within the annular flange so that its outer face rests against the inner face of the washer 1 and its peripherey engages the interior of the ring 5, after which the sheet metal washer 7 is placed in engagement with the inner face of the washer 6.

The felt washer 8 is placed against the outer surface of the washer and is retained thereon by cement, said ring being passes over the spindle 2'.

From this construction it will be seen that when the device is in place the leakage of grease will be reduced and any grease which may leak will be absorbed by the felt washer and rings. It will be further noted that by providing a device of this character that entrance of dust to the axle will be prevented.

What is claimed is:—

1. A device of the class described, comprising a washer having a central opening for passing over an axle spindle, said washer having its periphery terminating in an annular flange, a felt washer having its outer face bearing against the inner face of the washer, a felt ring inclosed by the annular flange and inclosing the felt washer, a metallic washer engaged with the inner face of the felt washer and inclosed by the felt ring, a second felt ring secured to the outer surface of the washer, said annular flange having its periphery terminating in an inwardly directed annular flange which bears against the first named felt ring, as and for the purpose set forth.

2. A device of the class described comprising a washer having a central opening for passing over an axle spindle, an annular flange integral with and extending at right angles to said washer, a felt washer inclosed by the flange and disposed flat against said washer, a felt ring inclosed by the flange and disposed at an angle to the felt washer, a metal washer engaging the felt washer on its outer face, said annular flange carrying an annular inwardly directed flange for engaging one edge of the felt ring, as and for the purpose set forth.

In testimony whereof, I affix my signature, in the presence of two witnesses.

GEORGE E. FLOWERS.

Witnesses:
 HAMILTON J. HEWITT,
 A. W. DUBBEN.